US009439053B2

(12) United States Patent
Abraham et al.

(10) Patent No.: US 9,439,053 B2
(45) Date of Patent: Sep. 6, 2016

(54) IDENTIFYING SUBGRAPHS IN TRANSFORMED SOCIAL NETWORK GRAPHS

(71) Applicant: Microsoft Corporation, Redmond, WA (US)

(72) Inventors: Ittai Abraham, San Francisco, CA (US); Joseph K. Bradley, Pittsburgh, PA (US); Shiri Chechik, Mountain View, CA (US); Moises Goldszmidt, Palo Alto, CA (US); Aleksandrs Slivkins, New York, NY (US); David Kempe, Los Angeles, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 391 days.

(21) Appl. No.: 13/754,881

(22) Filed: Jan. 30, 2013

(65) Prior Publication Data
US 2014/0214936 A1    Jul. 31, 2014

(51) Int. Cl.
*H04L 29/08*    (2006.01)
*H04W 4/20*    (2009.01)

(52) U.S. Cl.
CPC .................................... *H04W 4/206* (2013.01)

(58) Field of Classification Search
CPC ..... H04L 67/22; H04L 51/32; H04L 67/306; G06Q 50/01
See application file for complete search history.

(56) References Cited

U.S. PATENT DOCUMENTS

| 8,301,617 | B2 | 10/2012 | Muntz et al. | |
| 8,832,132 | B1* | 9/2014 | Spertus et al. | 707/765 |
| 8,909,646 | B1* | 12/2014 | Fabrikant et al. | 707/737 |
| 2012/0290565 | A1 | 11/2012 | Wana et al. | |
| 2012/0299925 | A1* | 11/2012 | Najork et al. | 345/440 |
| 2013/0006935 | A1* | 1/2013 | Grisby | 707/635 |
| 2013/0013601 | A1* | 1/2013 | Kabiljo et al. | 707/737 |
| 2013/0013667 | A1* | 1/2013 | Serena | 709/203 |
| 2013/0254305 | A1* | 9/2013 | Cheng | H04L 51/32 709/206 |

OTHER PUBLICATIONS

Benevenuto, et al., "Practical Detection of Spammers and Content Promoters in Online Video Sharing Systems", Retrieved at <<http://dblab.mgt.ncu.edu.tw/%E6%95%99%E6%9D%90/2012_SNM/35.pdf>>, In the IEEE Transactions on Systems, Man, and Cybernetics, Cybernetics, Jun. 2012, pp. 14.

(Continued)

*Primary Examiner* — Nicholas Taylor
*Assistant Examiner* — Afroza Sultana
(74) *Attorney, Agent, or Firm* — Nicholas Chen; Kate Drakos; Micky Minhas

(57) ABSTRACT

A graph of a social network is received. The graph may include a node for each user account and an edge between nodes that represent social networking relationships such as messages between the user accounts or a friend relationship. The graph is transformed into a transformed graph where nodes have direct edges depending on a local test among its neighbors in the original graph. Small subsets of the transformed graph are categorized. The categories are used to identify subgraphs in the transformed graph. Each subgraph is grown by adding an edge from the transformed graph to the subgraph depending on local tests among nodes associated with the edge that have at least one edge that is already in the subgraph. The categorized subgraphs are used to provide targeted advertising, suggest new connections, identify different personalities and interests of users, or to provide other services.

20 Claims, 6 Drawing Sheets

(56) References Cited

OTHER PUBLICATIONS

Khandekar, et al., "On the Advantage of Overlapping Clusters for Minimizing Conductance", Retrieved at <<http://www.crab.rutgers.edu/~guyk/pub/overlap/nabs.pdf>>, Aug. 2, 2011, pp. 23.

Wang, et al., "Social Event Detection with Interaction Graph Modeling", Retrieved at <<http://arxiv.org/pdf/1208.2547.pdf>>, In Proceedings of the 20th ACM Multimedia Conference, Oct. 29, 2012, pp. 4.

Crespo, et al., "Lock-in or Lock-out? How Structural Properties of Knowledge Networks Affect Regional Resilience?", Retrieved at <<http://econ.geo.uu.nl/peeg/peeg1204.pdf>>, Mar. 5, 2012, pp. 20.

Wilson, et al., "Beyond Social Graphs: User Interactions in Online Social Networks and their Implications", Retrieved at <<http://www.ccs.neu.edu/home/cbw/pdf/a17-wilson.pdf>>, In the ACM Transactions on the Web, Nov. 2012, pp. 31.

Abraham, et al., "Low-Distortion Inference of Latent Similarities from a Multiplex Social Network", Retrieved at <<http://arxiv.org/pdf/1202.0922v2.pdf>>, In the Computing Research Repository, Feb. 29, 2012, pp. 46.

Adamic, et al., "Friends and Neighbors on the Web", Retrieved at <<http://social.cs.uiuc.edu/class/cs591kgk/friendsadamic.pdf>>, In Journal of Social Networks, vol. 25, Jul. 2003, pp. 20.

Adamic, et al., "How to Search a Social Network", Retrieved at <<http://cond.org/socsearch.pdf>>, In Journal of Social Networks, vol. 27, Issue 3, Jul. 2005, pp. 18.

Arora, et al., "Finding Overlapping Communities in Social Networks: Toward a Rigorous Approach", Retrieved at <<http://arxiv.org/pdf/1112.1831.pdf>>, In ACM Conference on Electronic Commerce, Jun. 4, 2012, pp. 19.

Backstrom, et al., "Find Me if You Can: Improving Geographical Prediction with Social and Spatial Proximity", Retrieved at <<http://www.cameronmarlow.com/media/backstrom-geographical-prediction_0.pdf>>, In Proceedings of the 19th International Conference on World Wide Web, Apr. 26, 2010, pp. 10.

Balcan, et al., "Finding Endogenously Formed Communities", Retrieved at <<http://research.microsoft.com/en-us/um/people/jchayes/Papers/Commun.pdf>>, Feb. 29, 2012, pp. 22.

Barthelemy, Marc., "Spatial Networks", Retrieved at <<http://systemsci.org/wp-content/uploads/group-documents/5/1318091245-11Review_SpatialNetpdf>>, In Physics Reports 499, Retrieved Date: Jan. 29, 2013, pp. 79.

Butts, Carter T., "Predictability of Large-Scale Spatially Embedded Networks", Retrieved at <<http://aris.ss.uci.edu/~lin/19.pdf>>, In Dynamic Social Network Modeling and Analysis, Oct. 23, 2002, pp. 11.

Chan, et al., "On hierarchical Routing in Doubling Metrics", Retrieved at <<http://ce.sharif.ac.ir/~ghodsi/archive/d-papers/ACM%20SODA/2005/On%20Hierarchical%20Routing%20in%20Doubling%20Metrics.pdf>>, In Proceedings of the Sixteenth Annual ACM-SIAM Symposium on Discrete Algorithms, Jan. 23, 2005, pp. 10.

Clauset, et al., "Hierarchical Structure and the Prediction of Missing Links in Networks", Retrieved at <<http://www.cecm.usp.br/~eris/pub/artigos/newman-hierarchy-nature.pdf>>, In Nature, May 1, 2008, pp. 4.

Danon, et al., "Comparing Community Structure Identification", Retrieved at <<http://complex.ffn.ub.es/~albert/Albert_Diaz-Guilera/Publications_files/J%20Stat%20Mech-Theory%20E%202005%20Danon.pdf>>, In Journal of Statistical Mechanics, Sep. 26, 2005, pp. 11.

Barthelemy, Marc., "Concentration of Measure for the Analysis of Randomized Algorithms", Retrieved at <<http://citeseerx.ist.psu.edu/viewdoc/download?doi=10.1.1.120.2561&rep=rep1&type=pdf>>, In Cambridge University Press, Retrieved Date: Jan. 29, 2013, pp. 207.

Fienberg, et al., "Statistical Analysis of Multiple Sociometric Relations", Retrieved at <<http://www.stat.cmu.edu/~fienberg/Stat36-835/FienbergMeyerWasserman-JASA-1985.pdf>>, In Journal of the American Statistical Association, vol. 80, Issue 389, Mar. 1985, pp. 18.

Fortunato, Santo., "Community Detection in Graphs", Retrieved at <<http://www.uvm.edu/~pdodds/teaching/courses/2009-08UVM-300/docs/others/everything/fortunato2010a.pdf>>, In Physics Report, vol. 486, Feb. 2010, pp. 100.

Fortunato, et al., "Community Structure in Graphs", Retrieved at <<http://arxiv.org/pdf/0712.2716.pdf>>, Dec. 17, 2007, pp. 42.

Fraigniaud, Pierre., "Small Worlds as Navigable Augmented Networks: Model, Analysis, and Validation", Retrieved at <<http://citeseerx.ist.psu.edu/viewdoc/download?doi=10.1.1.100.3496&rep=rep1&type=pdf>>, In Proceedings of the 15th Annual European Conference on Algorithms, Oct. 8, 2007, pp. 10.

Fraigniaud, et al., "A Doubling Dimension Threshold O (Log Log n) for Augmented Graph Navigability", Retrieved at <<http://www.liafa.univ-paris-diderot.fr/~pierref/POSTSCRIPTS/ESA2006.pdf>>, In Proceedings of the 14th Conference on Annual European Symposium—vol. 14, Sep. 11, 2006, pp. 11.

Fraigniaud, et al., "Recovering the Long-Range Links in Augmented Graphs", Retrieved at <<http://hal.archives-ouvertes.fr/docs/00/14/75/36/PDF/RRinria.pdf>>, In Journal of Theoretical Computer Science, vol. 411, Mar. 2010, pp. 20.

Gupta, et al., "Bounded Geometries, Fractals, and Low Distortion Embeddings", Retrieved at <<http://homes.cs.washington.edu/~jrl/papers/ass-focs.pdf>>, In Proceedings of the 44th Annual IEEE Symposium on Foundations of Computer Science, Oct. 11, 2003, pp. 10.

Handcock, et al., "Model-based Clustering for Social Networks", Retrieved at <<https://www.stat.washington.edu/~raftery/Research/PDF/Handcock2007.pdf>>, In Journal of the Royal Statistical Society, Series A, Mar. 2007, pp. 54.

Hoff, et al., "Latent Space Approaches to Social Network Analysis", Retrieved at <<http://www.stat.washington.edu/raftery/Research/PDF/hoff2002.pdf>>, In Journal of the American Statistical Association, Dec. 2002, pp. 9.

Kermarrec, et al., "Distributed Social Graph Embedding", Retrieved at <<http://hal.archives-ouvertes.fr/docs/00/49/52/50/PDF/RR-7327.pdf>>, In Technical Report RR-7327, INRIA, Jun. 25, 2010, pp. 26.

Kleinberg, Jon M., "Navigation in a Small World", Retrieved at <<http://www.cs.princeton.edu/~chazelle/courses/BIB/KleinbergNature.pdf>>, In Nature: International Weekly Journal of Science, vol. 406, Aug. 24, 2000, p. 1.

Kleinberg, Jon., "The Small-World Phenomenon: An Algorithmic Perspective", Retrieved at <<http://www.cadmo.ethz.ch/education/lectures/FS08/RA_PM/smallworld.pdf>>, In Proceedings of the Thirty-Second Annual ACM Symposium on Theory of Computing, May 21, 2000, pp. 8.

Kleinberg, Jon., "Small-World Phenomena and the Dynamics of Information", Retrieved at <<http://dcg.ethz.ch/lectures/fs10/seminar/paper/michael-4.pdf>>, In Proceedings of the 13th Advances in Neural Information Processing Systems, Dec. 3, 2001, pp. 8.

Kleinberg, Jon., "Complex Networks and Decentralized Search Algorithms", Retrieved at <<http://www.icm2006.org/proceedings/Vol_III/contents/ICM_Vol_3_50.pdf>>, In Proceedings of the International Congress of Mathematicians, Aug. 22, 2006, pp. 26.

Kleinberg, et al., "Triangulation and Embedding using Small Sets of Beacons", Retrieved at <<http://research.microsoft.com/pubs/132075/focs04_j.pdf>>, In Journal of the ACM, vol. 56, Issue 6, Sep. 2009, pp. 31.

Krivitsky, et al., "Representing Degree Distributions, Clustering, and Homophily in Social Networks with Latent Cluster Random Effects Models", Retrieved at http://www.stat.washington.edu/~raftery/Research/PDF/ Krivitsky2009.pdf>>, In Journal of Social Networks, vol. 31, Issue 3, Jul. 2009, pp. 10.

Liben-Nowell, et al., "The Link-Prediction Problem for Social Networks", Retrieved at <<http://dm.kaist.ac.kr/kse625/resources/Liben-Nowell_2007.pdf>>, In Journal of the American Society for Information Science and Technology, vol. 58, Issue 7, May 2007, pp. 13.

Liben-Nowell, et al., "Geographic Routing in Social Networks", Retrieved at <<http://www.pnas.org/content/102/33/11623.full.

(56) References Cited

OTHER PUBLICATIONS pdf>>, In Proceedings of the National Academy of Sciences, vol. 102, Issue 33, Aug. 16, 2005, pp. 6.

Liu, et al., "Large Scale Behavioral Targeting with a Social Twist", Retrieved at <<http://www.leitang.net/papers/cikm2011-social-bt.pdf>>, In Proceedings of the 20th ACM International Conference on Information and Knowledge Management, Oct. 24, 2011, pp. 10.

Marsden, et al., "Network Studies of Social Influence", Retrieved at <<http://smr.sagepub.com/content/22/1/127.full.pdf+html>>, In Sociological Measures and Research, vol. 22, Issue 1, Aug. 1993, pp. 26.

McPherson, et al., "Birds of a Feather: Homophily in Social Networks", Retrieved at <<http://datamining.dongguk.ac.kr/work/Hyejoo/ref/birds%20of%20a%20feather-homophily.pdf>>, In the Annual Review of Sociology, vol. 27, Aug. 2001, pp. 31.

Nguyen, et al., "Analyzing and Characterizing Small-World Graphs", Retrieved at <<http://www.cs.ucdavis.edu/~martel/main/submitted.pdf>>, In Proceedings of the Sixteenth Annual ACM-SIAM Symposium on Discrete Algorithms, Jan. 23, 2005, pp. 10.

Raftery, et al., "Fast Inference for the Latent Space Network Model using a Case-Control Approximate Likelihood", Retrieved at <<http://www.stat.washington.edu/research/reports/2010/tr572.pdf>>, In Technical Report No. 572, Department of Statistics, University of Washington, Jul. 21, 2010, pp. 22.

Sarkar, et al., "Theoretical Justification of Popular Link Prediction Heuristics", Retrieved at <<http://www.cs.cmu.edu/~deepay/mywww/papers/colt10-linkpred.pdf>>, In 23rd Conference on Learning Theory, Jun. 27, 2010, pp. 15.

Sarkar, et al., "Dynamic Social Network Analysis using Latent Space Models", Retrieved at <<http://www.cs.cmu.edu/afs/cs.cmu.edu/Web/People/psarkar/NIPS2005_0724.pdf>>, In 17th Advances in Neural Information Processing Systems, Dec. 5, 2005, pp. 8.

Schaeffer, Satu Elisa., "Graph Clustering", Retrieved at <<http://geza.kzoo.edu/~erdi/patent/Schaeffer07.pdf>>, In Journal of Computer Science Review, vol. 1, Issue 1, Aug. 2007, pp. 38.

Schweinberger, et al., "Settings in Social Networks: A Measurement Model", Retrieved at <<http://citeseerx.ist.psu.edu/viewdoc/download?doi=10.1.1.76.670&rep=rep1&type=pdf>>, In Sociological Methodology, vol. 33, Issue 1, Jan. 2003, pp. 37.

Slivkins, Aleksandrs., "Distance Estimation and Object Location via Rings of Neighbors", Retrieved at <<http://citeseerx.ist.psu.edu/viewdoc/download?doi=10.1.1.129.3376&rep=rep1&type=pdf>>, In Proceedings of the Twenty-Fourth Annual ACM Symposium on Principles of Distributed Computing, Feb. 2005, pp. 34.

Slivkins, Aleksandrs., "Towards Fast Decentralized Construction of Locality-Aware Overlay Networks", Retrieved at http://citeseerx.ist.psu.edu/viewdoc/download?doi=10.1.1.85.1460&rep=rep1&type=pdf>>, In the Twenty-Sixth Annual ACM Symposium on Principles of Distributed Computing, Feb. 2007, pp. 26.

Snijders, Tom A. B., "Statistical Models for Social Networks", Retrieved at <<http://www.stats.ox.ac.uk/~snijders/StatModels-SocNetworks.pdf>>, In Annual Review of Sociology, Aug. 2011, pp. 53.

Szell, et al., "Multi-Relational Organization of Large-Scale Social Networks in an Online World", Retrieved at <<http://www.insiteproject.org/wp-content/uploads/2012/08/18_8218fdc18a02eab92d8d41dc9962eb38.pdf>>, In Proceedings of the National Academy of Sciences, vol. 107, Issue 31, Aug. 3, 2010, pp. 6.

Tang, et al., "Relational Learning via Latent Social Dimensions", Retrieved at <<http://citeseerx.ist.psu.edu/viewdoc/download?doi=10.1.1.150.9537&rep=rep1&type=pdf>>, In 15th ACM SIGKDD International Conference on Knowledge Discovery and Data Mining, Jun. 2009, pp. 9.

Watts, et al., "Identity and Search in Social Networks", Retrieved at <<http://distcomp.ethz.ch/lectures/fs10/seminar/paper/michael-3.pdf>>, In Journal of Science, vol. 296, May 17, 2002, pp. 5.

Wellman, et al., "Different Strokes from Different Folks: Community Ties and Social Support", Retrieved at <<http://www.bebr.ufl.edu/files/Different%20Strokes%20From%20Different%20Folks-Community%20Ties%20and%20Social%20Support.pdf>>, In American Journal of Sociology, vol. 96, Issue 3, Nov. 1990, pp. 31.

* cited by examiner

300

IDENTIFYING SUBGRAPHS IN TRANSFORMED SOCIAL NETWORK GRAPHS

BACKGROUND

Social networks can be represented as graphs with a node for each user's account and an edge between nodes representing communications between user accounts, or relationships in the social network such as "friends" or "following." The underlying social structures of such graphs can be used to optimize a variety of applications such as search engines and advertising delivery systems. For example, users of the social network can be provided advertisements for products that their friends in the social network have purchased.

While social network graphs are useful, there are difficulties associated with their use. First, while users who are associated in the social network are often similar, some users with relationships in the social network may be sufficiently different to appear random. Second, social networks are multiplex in that they may be a union of multiple independent relationships among the users. For example, users may interact with users in the social network that they work with, go to school with, or are related to, which may result in connections between users in the graph who have little in common other than a single relationship. These weakly connected users may introduce noise into the social network graph that may overstate the similarity of the users. The noise may further lead to poor performance for search engines or advertising delivery systems that rely on the social network graphs.

SUMMARY

A graph that represents a social network is received. The graph may include a node for each user account and an edge between nodes that represent social networking relationships such as messages between the user accounts or a friend relationship. The graph is transformed to remove edges between nodes that have less than a threshold number of common neighbors, and to add edges between nodes that have more than the threshold number of common neighbors but no edge between them. The edges of the transformed graph are categorized. The categories are used to identify subgraphs of the transformed graph. Each of the subgraphs is grown by adding an edge from the transformed graph to the subgraph if there is more than a threshold number of paths of length two between the nodes associated with the edge that have at least one edge that is already in the subgraph. The subgraphs and their categories may be used for targeted advertising or to provide other services.

In an implementation, a graph is received by a computing device. The graph includes edges and nodes. A transformed graph is generated from the received graph by the computing device by, for each pair of nodes of the graph: determining if a number of paths in the graph between the pair of nodes exceeds a threshold; if so, adding an edge between the pair of nodes to the transformed graph; and otherwise, omitting the edge between the pair of nodes from the transformed graph. A request for a distance between a first node in the received graph and a second node in the received graph is received. The distance between the first node and the second node is determined using the transformed graph. The determined distance is provided in response to the request.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
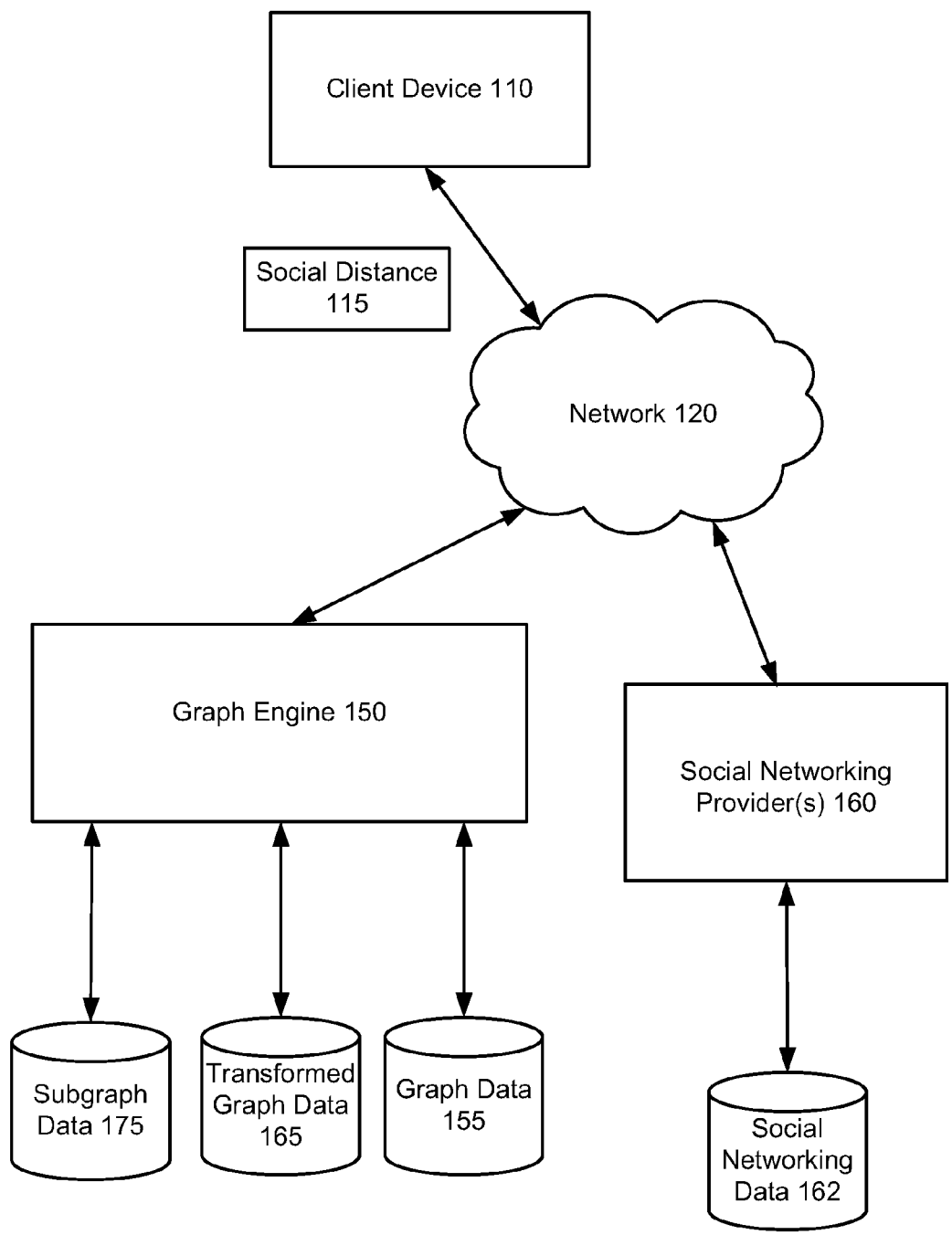
FIG. 1 is an illustration of an example environment for transforming a graph generated using social networking data, and for identifying and categorizing subgraphs within the transformed graph.

FIG. 1 is an illustration of an example environment 100 for transforming a graph generated using social networking data, and for identifying and categorizing subgraphs within the transformed graph. A client device 110 may communicate with one or more social networking providers 160 and a graph engine 150 through a network 120. The client device 110 may be configured to communicate with the social networking providers 160 to use one or more social networking applications. The network 120 may be a variety of network types including the public switched telephone network (PSTN), a cellular telephone network, and a packet switched network (e.g., the Internet).

In some implementations, the client device 110 may include a desktop personal computer, workstation, laptop, PDA, smart phone, cell phone, or any WAP-enabled device or any other computing device capable of interfacing directly or indirectly with the network 120. The client device 110 may run an HTTP client, e.g., a browsing program, such as MICROSOFT INTERNET EXPLORER or other browser, or a WAP-enabled browser in the case of a cell phone, PDA, or other wireless device, or the like. The client device 110 may be implemented using a general purpose computing device such as the computing device 600 illustrated in FIG. 6, for example.

In some implementations, the social networking provider 160 may provide access to one or more social networking applications to one or more users through the network 120. A social networking application may include any application that allows users to establish relationships with other users, and to exchange data or other information with other users. The social networking applications may include applications such as Facebook® and Twitter®. Other social networking applications may be supported.

The social networking provider 160 may store and/or provide social networking data 162. As used herein, social networking data 162 may be any data that is related to or indicative of interactions or relationships between the user accounts of the social networking provider 160. For example, the social networking data 162 may include indicators of "tweets" or messages sent between the user accounts, indicators of "friend" relationships or other voluntary associations between user accounts, and indicators of files or other data shared between user accounts.

The graph engine 150 may use the social networking data 162 to generate a graph or graphs based on the social networking data 162. The graphs may be stored as graph data 155. In some implementations, a generated graph may include a node for some or all of the user accounts of the social networking data 162 with edges between the nodes that represent the relationships or interactions among the user accounts associated with the nodes.

For example, the graph may include a node for each user account and an edge between nodes that are friends in the social network. In another example, the graph may include a node for each user account and an edge between nodes that represent communications (e.g., instant messages, emails, tweets, etc.) between the user accounts. Any method for generating a graph based on a social network may be used.

The graph may be weighted or not weighted, and may be directed or not directed. For example, for a weighted graph, the edges may be assigned a weight that is based on the strength of the social networking relationship between the user accounts associated with the nodes that the edges connect. The social networking relationship may be proportional to the number of communications or postings between the user accounts. For a directed graph, the direction of the edges may reflect the direction of the associated communications.

Because of noise introduced in the social networking data 162 due to relationships or communications between dissimilar users, the graph engine 150 may further generate a transformed graph from the graph of the social networking data 162. As described further with respect to FIG. 2, the transformed graph may be generated by the graph engine 150 by determining whether to add or omit an edge between two nodes from the transformed graph based on the number of paths of a specified length that exist in the graph between the nodes. The specified length may be two, for example. The threshold number of such paths may be determined by a user or an administrator, for example. Alternatively, the graph engine 150 may determine to add or omit an edge between two nodes based on the presence or absence of a structure in the graph with respect to the nodes. For example, the structure may be at least three paths of length four and at least two paths of length six. In another example, the structure may be four paths of length five that are connected by one edge. Other structures may be used.

As may be appreciated, by adding an edge based on the number of paths of length two in the graph between the nodes connected by the edge, the graph engine 150 is determining the number of friends (or other social networking relationship) that the nodes connected by the edge have in common. Similar users are likely to share many friends with other users, whereas dissimilar users are unlikely to have many friends in common. Thus, by omitting edges between nodes that have few friends in common from the transformed graph, the noise due to edges between dissimilar users is reduced. The transformed graph may be stored by the graph engine 150 as transformed graph data 165.

The graph engine 150 may then use the transformed graph to provide one or more services related to the social networking data 162. For example, one such service may be to determine the social distance 115 between two user accounts of the social networking data 162. Social distance 115 is a measure of how similar two users in a social networking application are.

The graph engine 150 may receive a request for the social distance 115 between two user accounts in the social networking data 162 from the client device 110. The graph engine 150 may determine the social distance 115 using the transformed graph by determining the shortest distance between the nodes representing the two user accounts in the transformed graph. The shortest distance may be provided to the client device 110 as the social distance 115. Because the transformed graph was transformed to remove edges between users that were likely dissimilar, the social distance 115 calculated using the transformed graph may more accurately reflect the true social distance between the two user accounts than a social distance calculated using the original or un-transformed graph.

In addition, the graph engine 150 may identify and grow one or more subgraphs from the transformed graph. Each subgraph may correspond to a particular category of relations between users in the social networking data 162. The categories may be determined by a user or administrator, for example, and may include categories based on the occupation, interests, residence, or any other user characteristic.

In some implementations, the graph engine 150 may identify each subgraph by first identifying clusters or dense subgraphs in the transformed graph (or alternatively the original graph) corresponding to one or more of the determined categories. Each cluster may be a densely connected region of the transformed graph of nodes and/or edges corresponding to a particular category. Any one of a variety of techniques for identifying clusters in graphs may be used.

After identifying a subgraph, the graph engine 150 may expand or grow a subgraph by considering each edge from the transformed graph that is not in the subgraph. If the nodes associated with the edge have more than a threshold number of paths between them in the transformed graph of length two with an edge that is already in the subgraph, then the edge may be added to the subgraph. Otherwise, the edge may be not be added to the subgraph. Other thresholds or structures may be used to determine whether to add an edge.

The graph engine 150 may grow each subgraph in this way until no further edges remain in the subgraph that meet the above described criteria. The threshold number of paths and/or the length of the paths may be specified by a user or administrator. The subgraphs and their associated categories may be stored as subgraph data 175.

As may be appreciated, by growing the subgraphs based on the number of paths of length two between the nodes of a considered edge that already have an edge in the subgraph, the graph engine 150 is expanding the subgraphs to include user accounts that are friends with, or have a social networking relationship with, a threshold number of user accounts that are already in the subgraph. Because the techniques used to identify the cliques in the transformed graph that the subgraphs were generated from may exclude many nodes and edges that may be part of the subgraph, expanding the subgraphs as described above may result in more inclusive subgraphs.

The graph engine 150 may the use the subgraphs and their associated categories for a variety of purposes including targeted advertising and/or the ranking of search results. For example, the social networking provider 160 may deliver an advertisement targeted to students to user accounts associated with subgraphs having categories corresponding to colleges or universities.

Figure 2:
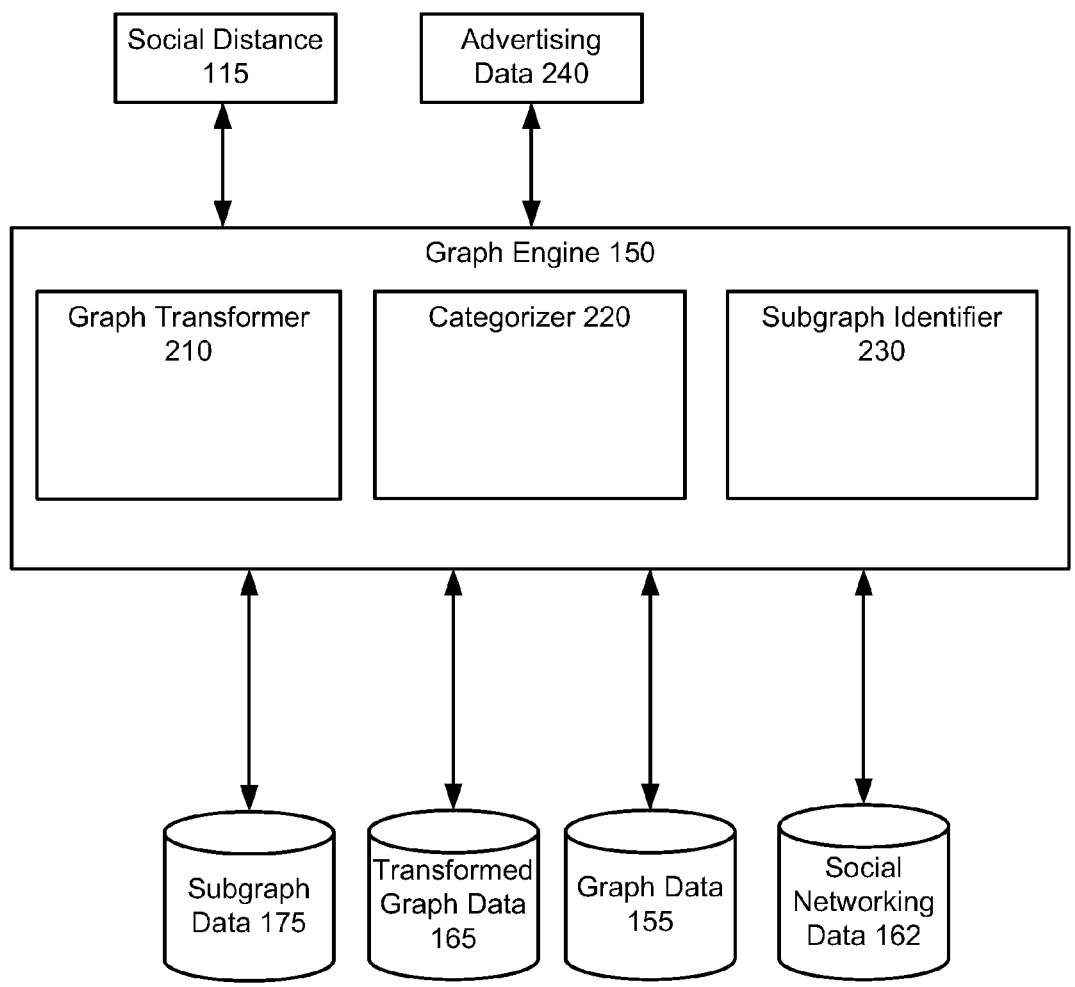
FIG. 2 is an illustration of an example graph engine.

FIG. 2 is an illustration of an example graph engine 150. As illustrated, the graph engine 150 includes several components including, but not limited to, a graph transformer 210, a categorizer 220, and a subgraph identifier 230. More or fewer components may be supported. The graph engine 150 may be implemented using a general purpose computing device such as the computing device 600 illustrated in FIG. 6, for example.

The graph transformer 210 may prune the graph representing the social networking data 162 to generate a transformed graph. The transformed graph may be transformed to remove edges between nodes that represent users that, despite the presence of an edge, may not have similar characteristics. For example, some users may be friends with users that they do not know very well. Similarly, the graph transformer 210 may add edges (where no edges already exist) between nodes that represent users that have similar characteristics. In particular, famous or semi-famous users may have many friends that they do not know, or may send messages to users that they have very little in common with. Thus, the graph transformer 210 may prune the graph to eliminate such edges. The transformed graph may be stored by the graph transformer 210 in the transformed graph data 165.

In some implementations, for un-weighted graphs, the graph transformer 210 may add an edge between two nodes to the transformed graph if there exists a threshold number of other paths between the two nodes of at most a selected length. The selected length may be two, but other lengths may be used. Each path of length two represents a common neighbor in the graph for the two nodes. Depending on the social network, a common neighbor may indicate a common friend or contact in the social network for the user accounts associated with the two nodes.

Figure 3:
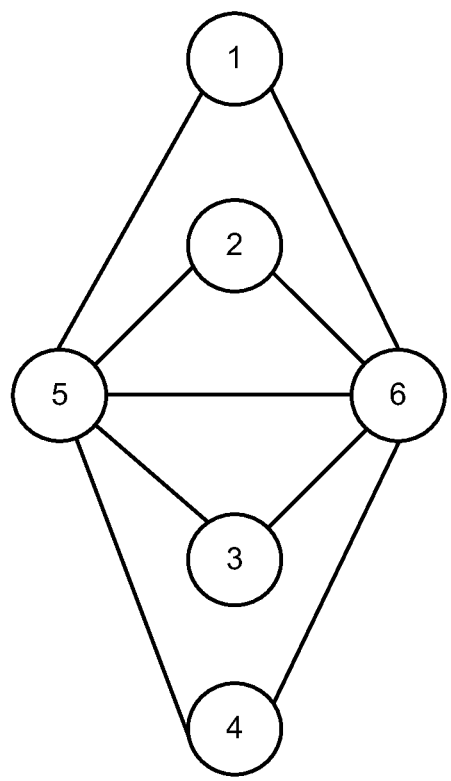
FIG. 3 is an illustration of an example graph.

For example, FIG. 3 is an illustration of an example graph 300 that includes a node 1, a node 2, a node 3, a node 4, a node 5, and a node 6. The graph transformer 210 may determine whether to add the edge between the node 5 and the node 6. As shown, the graph 300 includes four paths of length two between the nodes 5 and 6: a path through the node 1; a path through the node 2; a path through the node 3; and a path through the node 4. The paths show that the node 5 and the node 6 have the node 1, node 2, node 3, and node 4 as common neighbors.

The threshold number of paths used by the graph transformer 210 may be a constant threshold or may be a dynamic threshold. For a dynamic threshold, the threshold may be based on the size of the social network. Alternatively or additionally, the threshold may be based on the degree (i.e., the total number of neighbors) of one or both nodes associated with a considered edge. Intuitively, the number of common neighbors between two nodes is meaningful only in relation to the total number of neighbors of one or both nodes. Thus, for nodes with a high degree, a higher threshold may be used by the graph transformer 210 than for nodes with a low degree. The threshold may be based on the degree of both nodes (e.g., a sum of the degrees), or may be based on only one of the nodes (e.g., a minimum or maximum degree of the two nodes may be used).

For weighted graphs, the graph transformer 210 may add an edge to a graph if the sum of the weights on the paths of a specified length between the nodes associated with the considered edge exceeds a threshold. The specified length may be two, but other lengths may be used. The threshold may be a static or dynamic threshold, and may be similarly selected based on the degree of one or both of the nodes associated with the considered edge. Alternatively, the sum may be based only on the minimum (or maximum) edge weight for the edges in each path, and the sum may also include the weight of the considered edge.

In some implementations, the graph transformer 210 may determine to add an edge between a node i and a node j to the transformed graph, if the weight w(i, j) of the edge plus the sum of the minimum edge weight for each path of length two between the node i and j for all nodes k is above a threshold. Otherwise, the graph transformer 210 may omit the edge from the transformed graph. The condition may be expressed as:

$$w(i,j) + \Sigma_k \min\{w(i,k), w(k,j)\} \geq \text{threshold}$$

As described above, the threshold may be dynamic or may be static. In some implementations, the dynamic threshold may have an unnormalized threshold component and a normalized threshold component. The unnormalized component $\lambda_0$ may be selected to account for nodes with a low degree (e.g., a user account with few friends). The normalized component $\lambda_1 \cdot \max\{\deg(i), \deg(j)\}$ may be selected to account for nodes with a high degree (e.g., celebrities or user accounts with a large number of friends).

Accordingly, the graph transformer 210 may add an edge between the nodes i and j to the transformed graph when the following formula is satisfied:

$$w(i,j) + \Sigma_k \min\{w(i,k), w(k,j)\} \geq \lambda_1 \cdot \max\{\deg(i), \deg(j)\} + \lambda_0$$

The categorizer 220 may identify one or more categories for edges and/or nodes in the transformed graph. The identified categories may be stored with the corresponding edges and/or nodes in the transformed graph data 165. For implementations where the edges are categorized, the categorizer 220 may determine a category for an edge by a textual analysis of the communication (e.g., message or tweet) associated with the edge. For implementations where the nodes are categorized, the categorizer 220 may determine a category for a node based on information associated with the user account corresponding to the node in the social networking data 162. The categorizer 220 may determine the category for a node using a textual analysis of user profile information, based on information posted by the user, or based on information sent or generated by the user, for example.

In some implementations, the categories used by the categorizer 220 for each node or edge may be set by a user or an administrator. The categories may be associated with one or more advertising categories and may correspond to particular types of products or services. Other types of categories may be used, for example, in some implementations the categories may correspond to geographic locations (e.g., cities, states, countries), places of business, schools (e.g., particular high schools, colleges, or universities), or occupations.

The subgraph identifier 230 may identify one or more subgraphs in the transformed graph from the transformed graph data 165. The subgraph identifier 230 may identify the subgraphs in two stages including an identification stage where each subgraph is initially identified, and a growth stage where each of the identified subgraphs is expanded. More or fewer stages may be supported by the subgraph identifier 230. The subgraphs may be stored by the subgraph identifier as the subgraph data 175.

During the identification stage, the subgraph identifier 230 may identify the subgraphs by identifying clusters in the pruned graph. A cluster may be dense region of the graph that includes nodes that are highly connected to one another.

Any one of a variety of known techniques for identifying clusters in a graph may be used. Each identified cluster may be stored as a subgraph in the subgraph data 175.

In some implementations, the subgraph identifier 230 may identify a subgraph for some or all of the categories determined by the categorizer 220. The subgraph identifier 230 may identify a subgraph for a category by identifying a clique (or, more generally, a dense set of nodes or edges) in the transformed graph that has a diameter that is greater than a threshold length with respect to the category in the transformed graph. Each node or edge in the clique may be associated with the same category. The threshold length may be based on the number of nodes or edges in the transformed graph, or may be based on a desired minimum or maximum size for each subgraph.

During the growth stage, the subgraph identifier 230 may, for each subgraph, select edges from the transformed graph that are not already in the subgraph, and may determine whether to add the selected edge to the subgraph. For unweighted graphs, the subgraph identifier 230 may add a selected edge to the subgraph if a sum of the paths between the nodes connected by the selected edge of length two that also include an edge that is already in the subgraph exceeds a threshold number. The threshold number may be selected by a user or an administrator, and may be based on the size of the subgraph and the degree of the nodes associated with the selected edge.

If the sum does not exceed the threshold number, the subgraph identifier 230 may continue to consider edges from the transformed graph until no edge can be found that meets the criteria for inclusion in the subgraph. In some implementations, the edges may be randomly considered for inclusion in the subgraph. Alternatively, an edge may be selected for consideration that is close to an edge that was most recently added to the subgraph. The subgraph identifier 230 may consider each edge until no further edges that meet the criteria remain in the transformed graph, or after all edges in the transformed graph have been considered at least once.

For weighted graphs, the subgraph identifier 230 may add a selected edge to the subgraph if a sum of the weights of the paths between the nodes connected by the edge of length two that include an edge that is already in the subgraph exceeds a threshold number. Alternatively, the sum may only include the weight of the edge of a path that is already in the subgraph, rather than the both edges of the path. Similarly as for unweighted graphs, the threshold number may be selected by a user or an administrator, and may be based on the size of the subgraph and the degree of the nodes associated with the selected edge.

In some implementations, the categorizer 220 determines categories for the edges and/or nodes of the transformed graph, and the subgraph identifier 230 uses the determined categories to identify the subgraphs in the identification stage. As an alternative implementation, the subgraph identifier 230 may identify the subgraphs by identifying clusters in the transformed graph. Each identified cluster may be stored as a subgraph in the subgraph data 175. The subgraph identifier 230 may grow each subgraph as described above in the growth stage. The categorizer 220 may determine one or more categories for each determined subgraph based on the edges and/or nodes in the subgraph. The categorizer 220 may determine the category using a textual analysis of the social networking data 162 associated with the edges and/or nodes of the subgraphs as described above. The categorizer 220 may select the category, or categories, that is most associated with the edges and/or nodes in the subgraph as the category for the subgraph.

The graph engine 150 may use the transformed graphs and/or the subgraphs to provide a variety of services. One such service is the determination of social distances. The graph engine 150 may receive a request for a social distance 115 between two user accounts in the social networking data 162 from one or more of the client device 110 and/or the social networking provider 160. The graph engine 150 may determine the social distance 115 for the two user accounts using the corresponding nodes in the transformed graph. Using the transformed graph may result in a more accurate social distance 115 than the un-transformed graph because the transformed graph was transformed by the graph transformer 210 to remove edges between dissimilar user accounts.

Another example of a service that may be provided using the subgraphs is targeted advertising. For example, the social networking provider 160 and/or the client device 110 may request identifiers of user accounts in the social networking data 162 that are associated with a particular category. The graph engine 150 may provide identifiers of the user accounts associated with the nodes in the subgraph corresponding to the category. The identifiers may be provided as advertising data 240. The social networking provider 160 and/or the client device 110 may use the advertising data 240 to provided targeted advertisements to the identified user accounts.

As another example, the graph engine 150 may use the subgraphs to identify what are known as connector user accounts in a social network. A connector user account may be a user account corresponding to a node that is associated with many different subgraphs in the subgraph data 175. These connector user accounts are often connected to dissimilar groups of user accounts in the social network, and therefore the users associated with the connector user accounts may have unique interpersonal skills or influence in the social network. The graph engine 150 may use the subgraph 175 to identify such user accounts in the social network, and may provide identifiers of the user accounts to the client device 110 and/or the social networking provider 160. The influence of these connected users may be utilized by asking them to provide reviews or recommendations of products and/or services to their contacts in the social network, for example.

Figure 4:
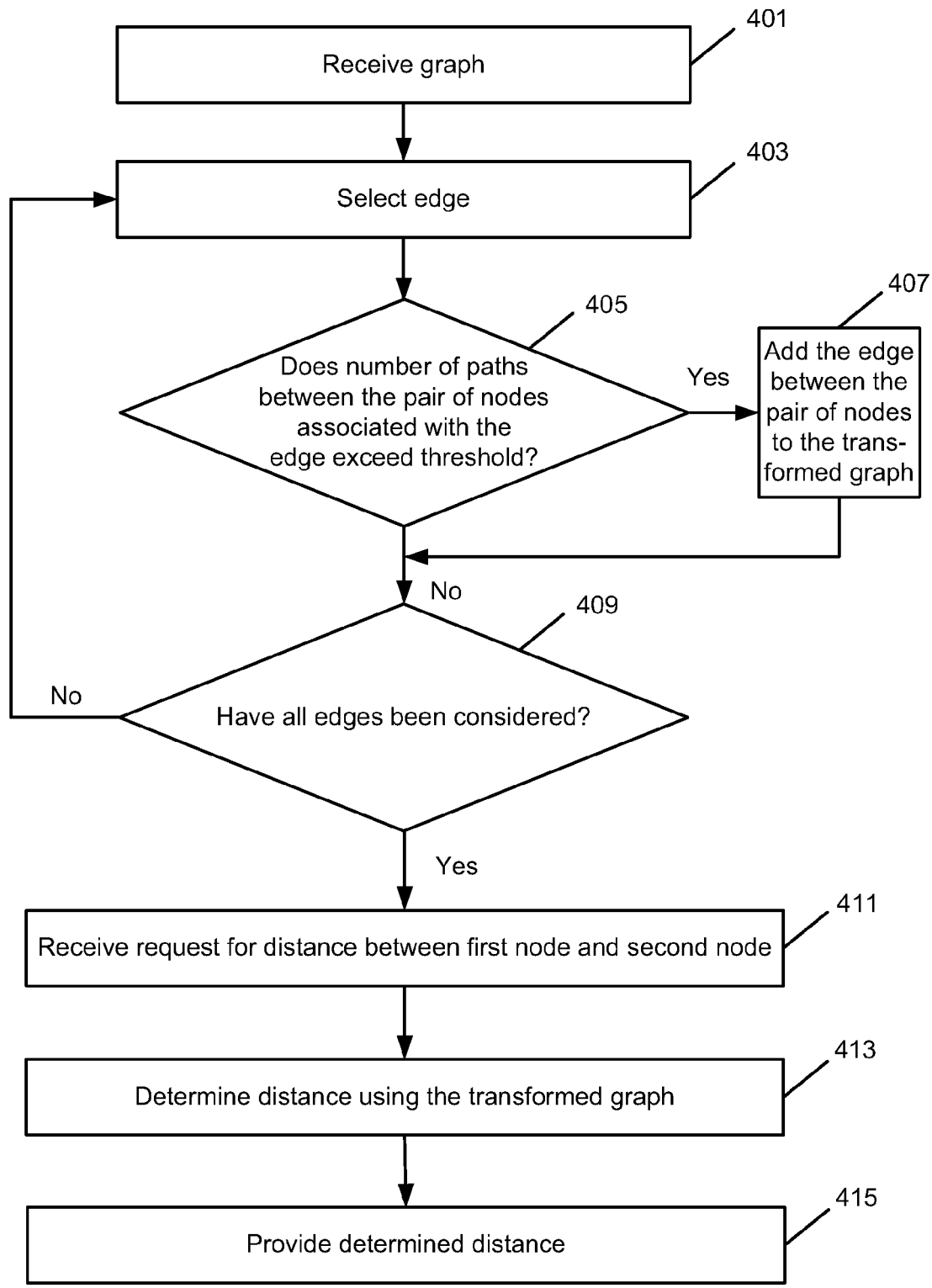
FIG. 4 is an operational flow of an implementation of a method for transforming a graph.

FIG. 4 is an operational flow of an implementation of a method 400 for transforming a graph. The method 400 may be implemented by the graph transformer 210 of the graph engine 150, for example.

A graph is received at 401. The graph may be received by the graph engine 150 from the social networking provider 160. The graph may include a plurality of edges and each edge may connect a pair of nodes. Each node may represent a user account in the social network associated with the social networking provider 160. Each edge may represent a relationship or communication between the user accounts corresponding to nodes connected by the edge.

An edge is selected at 403. The edge may be selected for consideration for a transformed graph by the graph transformer 210 of the graph engine 150. The edge may be an edge that already connects two nodes in the graph, or may be a proposed new edge that does not exist between two nodes of the graph.

A determination is made as to whether a number of paths between the pair of nodes associated with the selected edge exceeds a threshold at 405. The determination may be made by the graph transformer 210. The paths may be paths with a length of at most two edges. The threshold may be based on the degree of one or both of the nodes associated with the edge. Other lengths or structures may be used.

Where the graph is a weighted graph, the graph transformer 210 may determine if a sum of the weight of the selected edge between the pair of nodes with the weights of the edges of each path with a length of at most two between the pair of nodes exceeds the threshold. Alternatively, the graph transformer 210 may only consider the minimum edge weight for each path in the sum.

If the number exceeds the threshold, then the selected edge may be added to the transformed graph at 407. Otherwise, the selected edge may be omitted from the graph. The method 400 may then continue at 409.

At 409, a determination is made as to whether all of the edges in the graph have been considered. The determination may be made by the graph transformer 210 of the graph engine 150. If all of the edges in the graph have been considered, then the method 400 may continue at 411. If not, the method 400 may return to 403 where another edge of the graph may be selected for consideration for the transformed graph. In some implementations, the determination may be whether all possible edges between the nodes of the graph have been considered, and not just the edges that are actually part of the graph.

A request for a social distance is received at 411. The request may be received by the graph engine 150 from the social networking provider 160. The request may identify a first node and a second node in the received graph. The first node and the second node may correspond to user accounts in the social networking application.

The social distance is determined using the transformed graph at 413. The social distance 115 may be determined by the graph engine 150 using the transformed graph. The social distance 115 may be determined using any one of a variety of methods for determining the distance between two nodes of a graph. The social distance 115 may be the shortest distance between the first node and the second node in the transformed graph.

The determined social distance is provided at 415. The determined social distance 115 may be provided to the social networking provider 160 by the graph engine 150. The social distance 115 may be used for a variety of purposes by the social networking provider 160 including but not limited to query suggestions, targeted advertisements, and friend recommendations.

Figure 5:
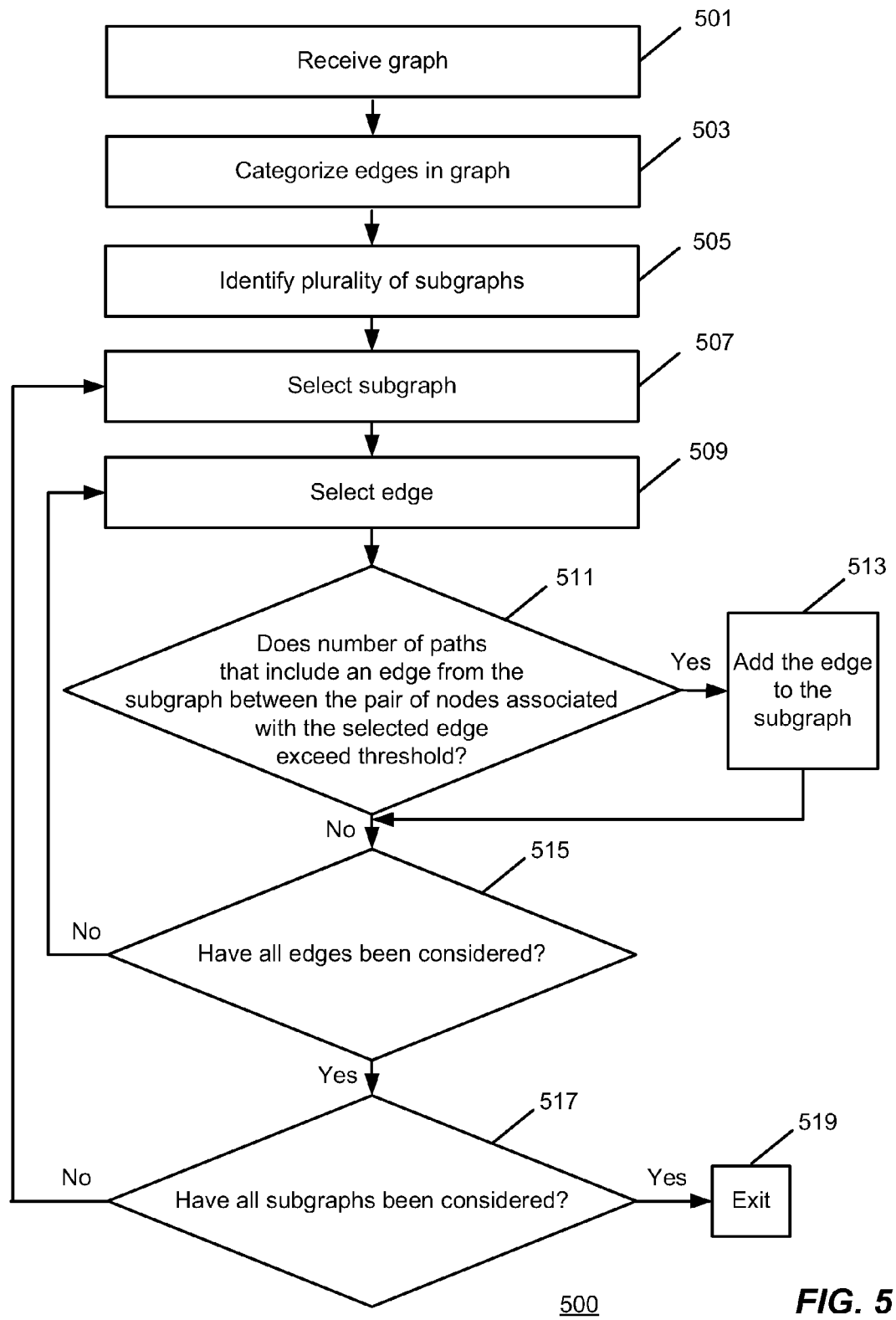
FIG. 5 is an operational flow of an implementation of a method for identifying one or more subgraphs of a graph.

FIG. 5 is an operational flow of an implementation of a method 500 for identifying one or more subgraphs of a graph. The method 500 may be implemented by the subgraph identifier 230 and the categorizer 220 of the graph server 150, for example.

A graph is received at 501. The graph may be received by the categorizer 220 of the graph engine 150 from the graph transformer 210. The graph may be a transformed graph. The graph may include a plurality of edges and each edge may connect a pair of nodes. The nodes and edges may represent a social network and may have been generated using social networking data 162.

Edges of the graph are categorized at 503. The edges and/or nodes of the graph may be categorized by the categorizer 220 of the graph engine 150. The edges may be categorized using a textual analysis of the social networking data 162 associated with the edges. Each edge may be placed into one or more of a plurality of different categories. The plurality of categories may have been selected by a user or an administrator.

A plurality of subgraphs is identified at 505. The subgraphs may be identified by the subgraph identifier 230 of the graph engine 150. Each subgraph may be identified by identifying a cluster or clique in the graph of edges and/or nodes that correspond to a particular category. Any system, method, or technique for identifying clusters or cliques in a graph may be used. In some implementations, a subgraph may be identified for some or all of the categories of the plurality of categories. The identified subgraphs may be stored as the subgraph data 175. The identification of the subgraphs by the subgraph identifier 230 may be the identification stage.

A subgraph is selected at 507. The subgraph may be selected from the plurality of subgraphs by the subgraph identifier 230. The selection of the subgraph may be the start of the growth stage, where each edge of the graph may be considered for addition to the subgraph by the subgraph identifier 230.

An edge is selected at 509. The edge may be an edge from the received graph that is not already in the selected subgraph, and may be selected by the subgraph identifier 230 of the graph engine 150. The edge may be randomly selected by the subgraph identifier 230 from the edges, or may be selected based on the proximity of the edge to a most recently added edge to the selected subgraph.

At 511, a determination is made of whether a number of paths of the graph between the pair of nodes of the selected edge that include an edge from the subgraph exceeds a threshold. The determination may be made by the subgraph identifier 230 of the graph engine 150. The paths may be paths with a length of at most two edges. Where the graph is a weighted graph, the number may be a sum of the weights of the edges of each path, or only the weights of the edges each path that are part of the subgraph. The threshold may be selected by a user or administrator based on the degree of the nodes associated with the selected edge, for example.

If the number exceeds the threshold, then the selected edge may be added to the subgraph at 513 and the method 500 may continue at 515. If the sum does not exceed the threshold, then the selected edge may be omitted from the subgraph and the method 500 may continue at 515.

At 515, a determination is made of whether all edges have been considered. If all edges of the graph have been considered then the method 500 may continue at 517. Otherwise, the method 500 may return to 509, where a new edge may be selected by the subgraph identifier 230 from the graph for consideration.

At 516, a determination is made of whether all of the subgraphs have been considered. If all of the subgraphs have been considered then the method 500 may exit at 519. Otherwise, the method 500 may continue at 507 where a next subgraph may be selected for the growth phase.

Figure 6:
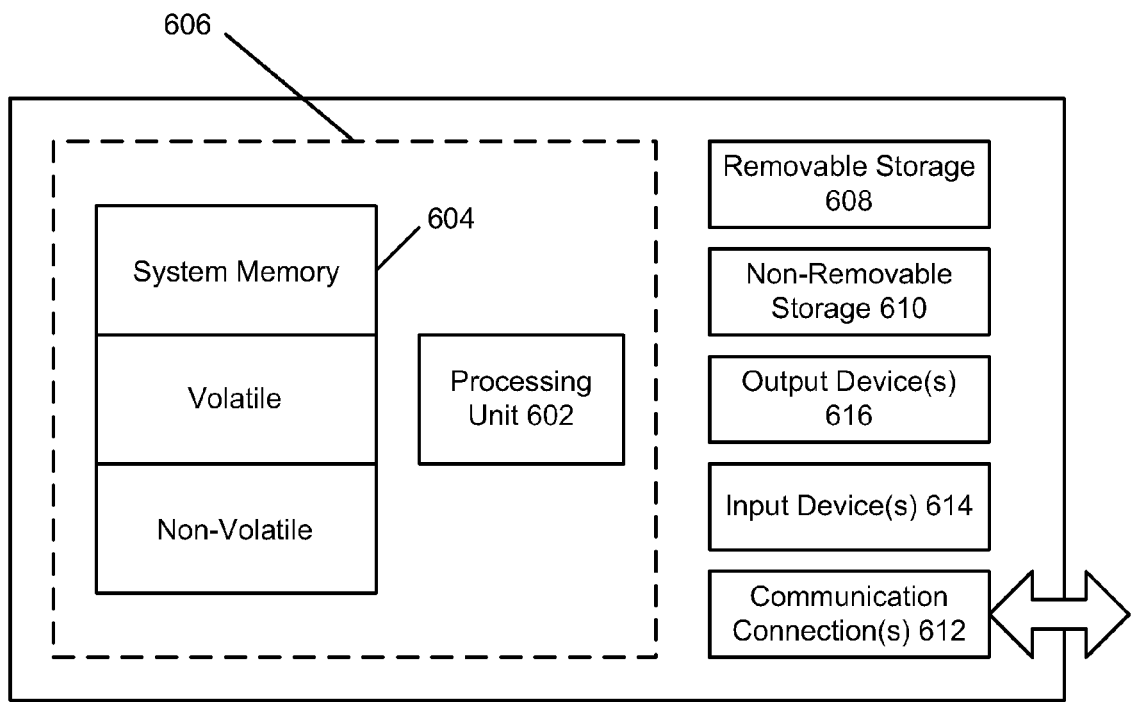
FIG. 6 shows an exemplary computing environment in which example embodiments and aspects may be implemented.

FIG. 6 shows an exemplary computing environment in which example embodiments and aspects may be implemented. An exemplary system for implementing aspects described herein includes a computing device, such as computing device 600. In its most basic configuration, computing device 600 typically includes at least one processing unit 602 and memory 604. Depending on the exact configuration and type of computing device, memory 604 may be volatile (such as random access memory (RAM)), non-volatile (such as read-only memory (ROM), flash memory, etc.), or some combination of the two. This most basic configuration is illustrated in FIG. 6 by dashed line 606.

Computing device 600 may have additional features/functionality. For example, computing device 600 may include additional storage (removable and/or non-removable) including, but not limited to, magnetic or optical disks or tape. Such additional storage is illustrated in FIG. 6 by removable storage 608 and non-removable storage 610.

Computing device 600 typically includes a variety of computer readable media. Computer readable media can be any available media that can be accessed by computing device 600 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 604, removable storage 608, and non-removable storage 610 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media may be part of computing device 600.

Computing device 600 may contain communications connection(s) 612 that allow the device to communicate with other devices. Computing device 600 may also have input device(s) 614 such as a keyboard, mouse, pen, voice input device, touch input device, etc. Output device(s) 616 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method comprising:
   receiving a graph by a computing device through a network, the graph comprising a plurality of edges and a plurality of nodes;
   generating a transformed graph from the received graph by the computing device by, for each pair of nodes of the plurality of nodes:
     determining a threshold based on a degree of one of the nodes of the pair of nodes by the computing device;
     determining if a number of paths in the graph between the pair of nodes exceeds the threshold by the computing device;
     in response to determining that the number of paths in the graph between the pair of nodes exceeds the threshold, adding an edge between the pair of nodes to the transformed graph by the computing device; and
     in response to determining that the number of paths in the graph between the pair of nodes does not exceed the threshold, omitting the edge between the pair of nodes from the transformed graph by the computing device;
   receiving a request for a distance between a first node in the received graph and a second node in the received graph by the computing device;
   determining the distance between the first node and the second node using the transformed graph by the computing device; and
   providing the determined distance through the network as a response to the request by the computing device.

2. The method of claim 1, wherein determining the threshold based on the degree of one of the nodes of the pair nodes comprises determining the threshold based on a maximum degree of the pair of nodes and a non-zero constant.

3. The method of claim 1, wherein determining if the number of paths in the graph between the pair of nodes exceeds the threshold comprises determining if a number of paths in the graph having no more than two edges between the pair of nodes exceeds the threshold.

4. The method of claim 1, wherein each edge further has an associated weight, and wherein determining if the number of paths in the graph between the pair of nodes exceeds the threshold comprises determining if a sum of the weights of the edges of each path between the pair of nodes exceeds the threshold.

5. The method of claim 4, wherein weight on an edge is based on a social networking relationship.

6. The method of claim 4, wherein determining if the sum of the weights of the edges of each path between the pair of nodes exceeds the threshold further comprises determining if a sum of a minimum weight edge of each path between the pair of nodes exceeds the threshold.

7. The method of claim 4, wherein the threshold comprises a normalized threshold and an unnormalized threshold.

8. The method of claim 7, wherein the normalized threshold is based on the sum of the weights of the edges associated with the nodes of the pair of nodes.

9. The method of claim 1, further comprising:
   identifying a subgraph of the transformed graph;
   selecting an edge from the transformed graph that is not in the subgraph;
   for the pair of nodes associated with the selected edge, determining if a number of paths between the pair of nodes of the selected edge in the transformed graph that include an edge from the subgraph exceeds a second threshold; and if so, adding the selected edge to the identified subgraph.

10. The method of claim 9, wherein the subgraph corresponds to a category and each category is based on a characteristic.

11. The method of claim 9, wherein selecting the edge from the transformed graph comprises randomly selecting an edge from the transformed graph.

12. The method of claim 9, wherein each path between the pair of nodes of the selected edge in the transformed graph has no more than two edges.

13. A method comprising:
receiving a graph by a computing device through a network, the graph comprising a plurality of edges and a plurality of nodes, wherein each edge of the plurality of edges is connected to a pair of nodes of the plurality of nodes;
identifying a plurality of subgraphs of the received graph by the computing device, wherein each subgraph includes a subset of the edges of the graph;
for each identified subgraph:
for each edge in the graph that is not in the subgraph:
determining a threshold based on a degree of one of the nodes of the pair of nodes associated with the edge in the graph by the computing device;
for the pair of nodes associated with the edge in the graph, determining if a number of paths between the pair of nodes in the graph that include an edge from the subgraph exceeds the threshold by the computing device;
in response to determining that the number of paths between the pair of nodes in the graph that include an edge from the subgraph exceeds the threshold, adding the edge in the graph to the identified subgraph by the computing device; and
in response to determining that the number of paths between the pair of nodes in the graph that include an edge from the subgraph does not exceed the threshold, omitting the edge in the graph from the identified subgraph by the computing device; and
providing the subgraphs in response to the received graph through the network by the computing device.

14. The method of claim 13, wherein each edge further has an associated weight, and wherein determining if the number of paths in the graph between the pair of nodes in the graph that include an edge from the subgraph exceeds the threshold comprises determining if a sum of the weights of the edges of each path between the pair of nodes in the graph that include an edge from the subgraph exceeds the threshold.

15. The method of claim 14, wherein determining if the sum of the weights of the edges of each path between the pair of nodes in the graph that include an edge from the subgraph exceeds the threshold further comprises determining if a sum of a minimum weight edge of each path between the pair of nodes in the graph that include an edge from the subgraph exceeds the threshold.

16. The method of claim 13, wherein identifying a plurality of subgraphs of the received graph comprises:
determining one or more categories for each edge in the graph; and
identifying a subgraph for each of the determined or more categories.

17. The method of claim 16, further comprising:
receiving an advertisement request, the request including a category;
fulfilling the received advertisement request using the subgraph corresponding to the included category.

18. A system comprising:
at least one computing device;
a graph transformer adapted to:
receive a graph through a network, the graph comprising a plurality of edges and a plurality of nodes, wherein each edge of the plurality of edges is connected to a pair of nodes of the plurality of nodes;
generate a transformed graph from the received graph, the transformed graph comprising fewer edges than the received graph; and
provide the transformed graph through the network in response to the received graph; and
a subgraph identifier adapted to:
identify a plurality of subgraphs of the transformed graph, wherein each subgraph includes a subset of the edges of the transformed graph; and
for each identified subgraph:
for each edge in the transformed graph that is not in the subgraph:
determine a threshold based on a degree of one of the nodes of the pair of nodes associated with the edge in the transformed graph;
for the pair of nodes associated with the edge in the transformed graph, determine if a number of paths between the pair of nodes in the transformed graph that include an edge from the subgraph exceeds the threshold;
in response to determining that the number of paths between the pair of nodes in the transformed graph that include an edge from the subgraph exceeds the threshold, add the edge of the transformed graph to the identified subgraph; and
in response to determining that the number of paths between the pair of nodes in the transformed graph that include an edge from the subgraph does not exceed the threshold, omit the edge of the transformed graph from the identified subgraph.

19. The system of claim 18, wherein the graph comprises a social network.

20. The system of claim 18, wherein the paths are of at most two edges.

* * * * *